US012764167B2

(12) United States Patent
Rupela et al.

(10) Patent No.: US 12,764,167 B2
(45) Date of Patent: Oct. 13, 2026

(54) SECURITY FEATURE ENFORCEMENT USING AI-BASED SECURITY POLICY GAP SUMMARIZATION

(71) Applicant: Microsoft Technology Licensing, LLC, Redmond, WA (US)

(72) Inventors: Anil Narsinhbhai Rupela, Redmond, WA (US); Ariel Nathan Schorr, Encino, CA (US); Huimin Jian, San Jose, CA (US); Sheldon Aare Prescott Slater, Woodinville, WA (US); Swetha Konnireddy, Monroe, WA (US); Dilesh Dhokia, Kirkland, WA (US); Nikhil Reddy Boreddy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 19/065,615

(22) Filed: Feb. 27, 2025

(65) Prior Publication Data

US 2026/0254854 A1 Aug. 27, 2026

(51) Int. Cl.

*H04L 29/06* (2006.01)
*H04L 9/40* (2022.01)
*H04L 41/16* (2022.01)

(52) U.S. Cl.

CPC .............. *H04L 63/20* (2013.01); *H04L 41/16* (2013.01); *H04L 63/083* (2013.01); *H04L 2463/082* (2013.01)

(58) Field of Classification Search

None

See application file for complete search history.

(56) References Cited

U.S. PATENT DOCUMENTS

| | | | | |
|---|---|---|---|---|
| 11,659,009 B2 * | 5/2023 | Dhokia | .................. | H04L 63/08 726/1 |
| 2021/0367966 A1 * | 11/2021 | Yanay | .................. | H04L 63/083 |
| 2022/0131904 A1 * | 4/2022 | Wright | .................. | H04L 63/102 |

(Continued)

OTHER PUBLICATIONS

"App Protection Policies Overview," Microsoft Intune, Microsoft Learn, Retrieved from URL: https://learn.microsoft.com/en-us/mem/intune/apps/app-protection-policy, Aug. 9, 2024, 25 pages.

(Continued)

*Primary Examiner* — Shin-Hon (Eric) Chen

(57) ABSTRACT

Techniques are described herein that are capable of using an AI model to summarize a gap in a security policy for security feature enforcement. A determination is made that a subset of reference security features is absent from enforced security features that are enforced in a system. The reference security features define a security policy template. The enforced security features define a security policy. A summary of the subset of the reference security features is generated using an AI model. The summary and an explanation may be caused to be presented via a user interface. The explanation indicates that the subset of the reference security features is absent from the enforced security features. The subset of the reference security features is caused to be enforced in the system by redefining the security policy, which comprises adding the subset of the reference security features to the enforced security features.

20 Claims, 5 Drawing Sheets

(56) References Cited

U.S. PATENT DOCUMENTS

2025/0112963 A1* 4/2025 Kfir ........................ G06F 40/205
2025/0274492 A1* 8/2025 Rodriguez .............. H04L 63/20

OTHER PUBLICATIONS

"Az login broken on chrome with ERR_SSL_Protocol_Error, Issue #10426," Azure/azure-cli, Retrieved from URL: https://github.com/Azure/azure-cli/issues/10426#issuecomment-528308713, Retrieved on Feb. 23, 2025, 9 pages.
"Combined Registration for SSPR and Microsoft Entra Multifactor Authentication," Microsoft Entra ID, Microsoft Learn, Retrieved from URL: https://learn.microsoft.com/en-us/entra/identity/authentication/concept-registration-mfa-sspr-combined#methods-available-in-combined-registration, Jan. 6, 2025, 12 pages.
"Control Security Information Registration with Conditional Access," Microsoft Entra ID, Microsoft Learn, Retrieved from URL: https://learn.microsoft.com/en-us/entra/identity/conditional-access/policy-all-users-security-info-registration, Oct. 22, 2024, 4 pages.
"Introduction to Semantic Kernel," Microsoft Learn, Retrieved from URL: https://learn.microsoft.com/en-us/semantic-kernel/overview/, Jun. 25, 2024, 3 pages.
"Manage App Consent Policies," Microsoft Entra ID, Microsoft Learn, Retrieved from URL: https://learn.microsoft.com/en-us/entra/identity/enterprise-apps/manage-app-consent-policies?pivots=ms-powershell, Mar. 21, 2024, 6 pages.
"Microsoft Entra Application Management Policy API Overview," Microsoft Graph v1.0, Microsoft Learn, Retrieved from URL: https://learn.microsoft.com/en-us/graph/api/resources/applicationauthenticationmethodpolicy?view=graph-rest-1.0, Nov. 12, 2024, 4 pages.
"Plugins in Semantic Kernel," Microsoft Learn, Retrieved from URL: https://learn.microsoft.com/en-us/semantic-kernel/concepts/plugins/?tabs=Csharp&pivots=programming-language-csharp#what-is-a-plugin, Dec. 11, 2024, 12 pages.
"Require MFA for Guest Users with Conditional Access," Microsoft Entra ID, Microsoft Learn, Retrieved from URL: https://learn.microsoft.com/en-us/entra/identity/conditional-access/policy-old-require-mfa-guest, Oct. 22, 2024, 2 pages.
"Respond to Identity Threats Using Copilot," Microsoft Entra, Microsoft Learn, Retrieved from URL: https://learn.microsoft.com/en-us/entra/fundamentals/copilot-security-entra, Dec. 10, 2024, 6pages.
"Simplify Conditional Access Policy Deployment with Templates," Microsoft Entra ID, Microsoft Learn, Retrieved from URL: https://learn.microsoft.com/en-us/entra/identity/conditional-access/concept-conditional-access-policy-common?tabs=secure-foundation, Oct. 22, 2024, 4 pages.
"Tokenizer", OpenAI API, Retrieved from URL: https://platform.openai.com/tokenizer, Retrieved on Feb. 23, 2025, 2 pages.
"Use Microsoft Bot Framework Skills," Microsoft Copilot Studio, Microsoft Learn, Retrieved from URL: https://learn.microsoft.com/en-us/microsoft-copilot-studio/advanced-use-skills, Feb. 6, 2025, 2 pages.
"What is Conditional Access in Microsoft Entra ID?" Microsoft Entra ID, Microsoft Learn, Retrieved from URL: https://learn.microsoft.com/en-us/entra/identity/conditional-access/overview, Mar. 19, 2024, 6 pages.
"What is Microsoft 365 Copilot?", Microsoft Learn, Retrieved from URL: https://learn.microsoft.com/en-us/copilot/microsoft-365/microsoft-365-copilot-overview, Feb. 13, 2025, 7 pages.
"What is Microsoft Security Copilot?", Microsoft Learn, Retrieved from URL: https://learn.microsoft.com/en-us/copilot/security/microsoft-security-copilot, Nov. 18, 2024, 4 pages.
Kanade, Salil, "Data Warehouse: Copilot & AI Skill," Microsoft Fabric Blog, Microsoft Fabric, Retrieved from URL: https://blog.fabric.microsoft.com/en-GB/blog/data-warehouse-copilot-ai-skill/, Nov. 4, 2024, 10 pages.
Margosis, Aaron, "New Tool: Policy Analyzer," Microsoft Community Hub, Retrieved from URL: https://techcommunity.microsoft.com/blog/microsoft-security-baselines/new-tool-policy-analyzer/701049, Jun. 19, 2019, 3 pages.
Wiggers, Kyle, "Microsoft Copilot: Everything you Need to Know About Microsoft's AI," TechCrunch, Retrieved from URL: https://techcrunch.com/2025/02/07/microsoft-copilot-everything-you-need-to-know-about-microsofts-ai/, Feb. 7, 2025, 22 pages.

* cited by examiner

SECURITY FEATURE ENFORCEMENT USING AI-BASED SECURITY POLICY GAP SUMMARIZATION

BACKGROUND

A security policy is a policy that includes features that are configured to increase security of a system and/or a user of the system. The security policy may be a combination of multiple security policies and/or incorporate features selected from multiple security policies. An information technology (IT) professional may wish to identify potential deficiencies in the security policy. However, conventional techniques for identifying the potential deficiencies have their limitations. For instance, the conventional techniques often consume a substantial amount of time and resources. Even if a conventional technique is capable of identifying the potential deficiencies, the conventional technique typically conveys the resulting information in an inefficient manner. For example, the IT professional often has difficulty comprehending the scope of the potential deficiencies based on the resulting information. Such limitations may increase vulnerability of the system to potential threats, such as a cyberattack.

SUMMARY

It may be desirable to use an artificial intelligence (AI) model to summarize a gap (a.k.a. a security policy gap) in a security policy. The security policy is defined by enforced security features. An enforced security feature is a security feature that is enforced (e.g., activated or turned on) in a system. By enforcing a security feature, it is meant that compliance with a requirement defined by the security feature is checked (e.g., verified). A security policy template is a template that is configured to be compared to a security policy. The security policy template is defined by reference security features. A reference security feature is a security feature that is configured to be compared to an enforced security feature of a security policy. In an example, the reference security features are recommended for enforcement in the system. The gap in the security policy is defined as a subset of the reference security features that is absent from the enforced security features. By using the AI model to summarize the gap in the security policy, the amount of time and resources that is consumed by an IT professional to identify the gap in the security policy and/or to comprehend the scope of the gap may be reduced.

In an example implementation, assume that the security policy includes first, second, and third features. In accordance with this implementation, further assume that the security policy template includes the first feature, the third feature, a fourth feature, and a fifth feature. In further accordance with this implementation, the gap in the security policy is defined by the fourth and fifth features because the first and third features of the security policy template are included in the security policy, and the fourth and fifth features of the security policy template are not included in the security policy. In further accordance with this implementation, the gap in the security policy is summarized using an AI model to provide a gap summary. In an example, the gap summary includes an abbreviated description of the fourth and fifth features. In further accordance with this implementation, the gap summary is presented to the IT professional, and the fourth and fifth features are incorporated into the security policy (e.g., to increase security of the system and/or a user of the system).

Various approaches are described herein for, among other things, using an AI model to summarize a gap in a security policy for security feature enforcement. In an example approach, a determination is made that a subset of a plurality of reference security features is absent from a plurality of enforced security features that are enforced in a system. The plurality of reference security features define a security policy template. The plurality of enforced security features define a security policy. A summary of the subset of the plurality of reference security features is generated using an AI model. In an aspect, the summary and an explanation are caused to be presented via a user interface. The explanation indicates that the subset of the plurality of reference security features is absent from the plurality of enforced security features that define the security policy. The subset of the plurality of reference security features is caused to be enforced in the system by redefining the security policy (e.g., using the summary and/or the explanation). Redefining the security policy comprises adding the subset of the plurality of reference security features to the plurality of enforced security features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURESE

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
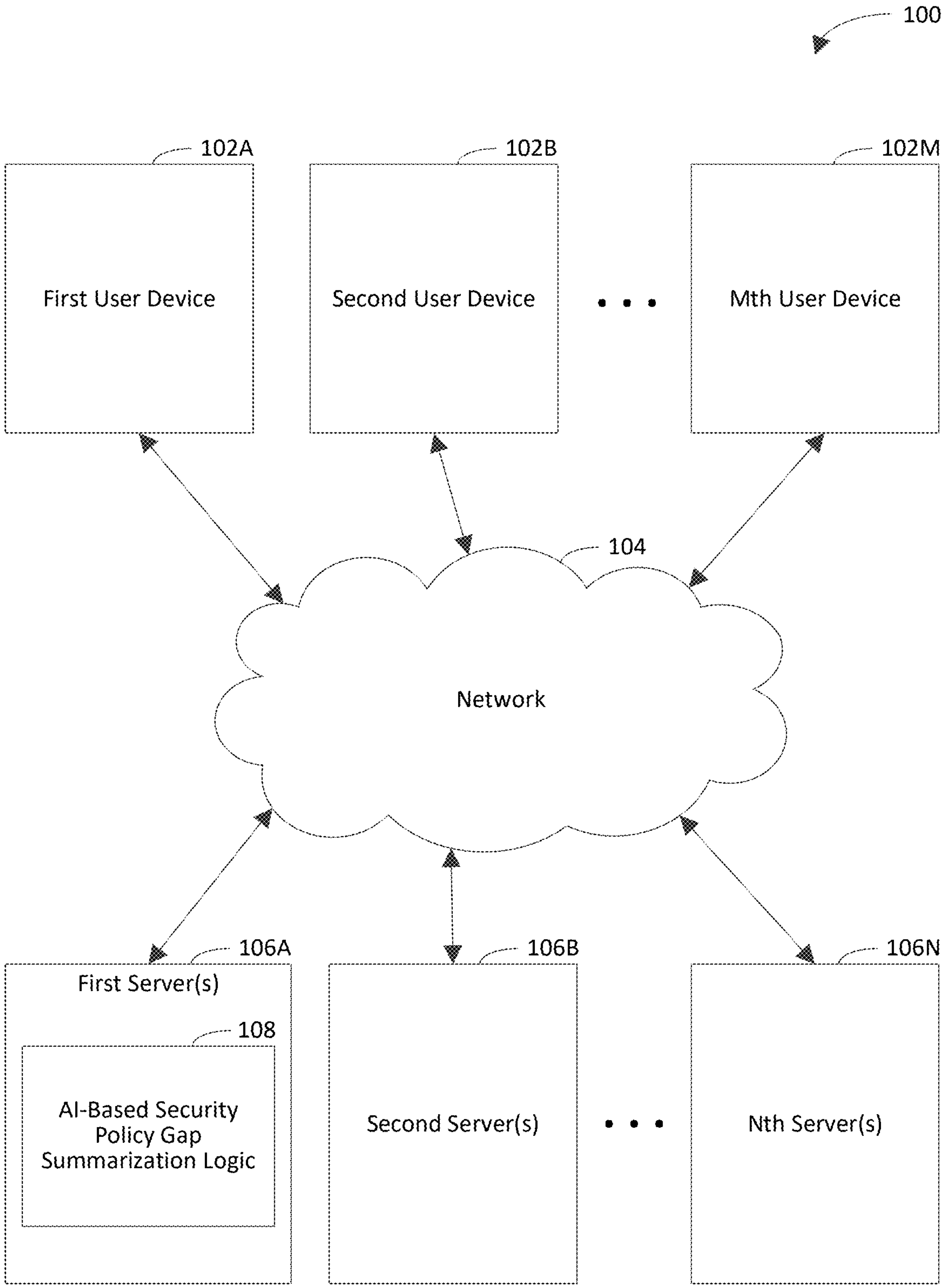
FIG. 1 is a block diagram of an example AI-based security policy gap summarization system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to use an artificial intelligence (AI) model to summarize a gap (a.k.a. a security policy gap) in a security policy. The security policy is defined by enforced security features. An enforced security feature is a security feature that is enforced (e.g., activated or turned on) in a system. By enforcing a security feature, it is meant that compliance with a requirement defined by the security feature is checked (e.g., verified). A security policy template is a template that is configured to be compared to a security policy. The security policy template is defined by reference security features. A reference security feature is a security feature that is configured to be compared to an enforced security feature of a security policy. In an example, the reference security features are recommended for enforcement in the system. The gap in the security policy is defined as a subset of the reference security features that is absent from the enforced security features. By using the AI model to summarize the gap in the security policy, the amount of time and resources that is consumed by an IT professional to identify the gap in the security policy and/or to comprehend the scope of the gap may be reduced.

In an example implementation, assume that the security policy includes first, second, and third features. In accordance with this implementation, further assume that the security policy template includes the first feature, the third feature, a fourth feature, and a fifth feature. In further accordance with this implementation, the gap in the security policy is defined by the fourth and fifth features because the first and third features of the security policy template are included in the security policy, and the fourth and fifth features of the security policy template are not included in the security policy. In further accordance with this implementation, the gap in the security policy is summarized using an AI model to provide a gap summary. In an example, the gap summary includes an abbreviated description of the fourth and fifth features. In further accordance with this implementation, the gap summary is presented to the IT professional, and the fourth and fifth features are incorporated into the security policy (e.g., to increase security of the system and/or a user of the system).

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

Artificial intelligence is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

Example embodiments described herein are capable of using an AI model to summarize a gap in a security policy for security feature enforcement. In an example approach, a determination is made that a subset of a plurality of reference security features is absent from a plurality of enforced security features that are enforced in a system. The plurality of reference security features define a security policy template. The plurality of enforced security features define a security policy. A summary of the subset of the plurality of reference security features is generated using an AI model. In an aspect, the summary and an explanation are caused to be presented via a user interface. The explanation indicates that the subset of the plurality of reference security features is absent from the plurality of enforced security features that define the security policy. The subset of the plurality of reference security features is caused to be enforced in the system by redefining the security policy (e.g., using the summary and/or the explanation). Redefining the security policy comprises adding the subset of the plurality of reference security features to the plurality of enforced security features.

Example techniques described herein have a variety of benefits as compared to conventional techniques for identifying, characterizing, and/or mitigating (e.g., resolving or eliminating) a security policy gap. For instance, the example techniques are capable of using an AI model to summarize the security policy gap. By using the AI model to summarize the security policy gap, the example techniques are capable of reducing an amount of time and/or resources that is consumed by an IT professional to identify the security policy gap and/or to comprehend a scope of the security policy gap. By reducing the amount of time that is consumed by the IT professional to identify the security policy gap and/or to comprehend the scope of the security policy gap, the example techniques are capable of increasing security of the system in which the plurality of enforced security features, which define the security policy, are enforced. For instance, by reducing the amount of time that is consumed, potential threats may be identified and/or addressed (e.g., remediated) more quickly.

The example techniques are capable of increasing the security of the system in other ways, as well. For instance, the example techniques are capable of increasing the security of the system by causing the subset of the plurality of reference security features to be enforced in the system. In an aspect, the subset of the plurality of reference security features is caused to be enforced in the system by redefining the security policy, which comprises adding the subset of the plurality of reference security features to the plurality of enforced security features.

The example techniques may reduce an amount of time and/or resources (e.g., processor cycles, memory, network bandwidth) that is consumed by a computing system to identify, characterize, and/or mitigate (e.g., resolve or eliminate) a security policy gap. For instance, by determining that a subset of a plurality of reference security features is absent from a plurality of enforced security features that define a security policy, the example techniques may reduce the amount of time and/or resources that is consumed to identify the security policy gap. By generating a summary of the subset of the plurality of reference security features using an AI model and causing the summary and an explanation to be presented via a user interface, the example techniques may reduce the amount of time and/or resources that is consumed to characterize the security policy gap. By causing the subset of the plurality of reference security features to be enforced in the system by redefining the security policy, the example techniques may reduce the amount of time and/or resources that is consumed to mitigate the security policy gap.

The example techniques may automate identifying, characterizing, and/or mitigating the security policy gap. For instance, the example techniques may automate determining that the subset of the plurality of reference security features is absent from the plurality of enforced security features, generating the summary of the subset of the plurality of reference security features (e.g., by using the AI model), causing the summary and the explanation to be presented via the user interface, and/or causing the subset of the plurality of reference security features to be enforced in the system. By reducing the amount of time and/or resources that is consumed by a computing system to perform any of the above-referenced operations, the efficiency of the computing system may be increased.

By reducing the amount of time that is consumed to identify, characterize, and/or mitigate a gap in a security policy, the example techniques may increase a user experience and/or efficiency of an IT professional who manages security of a system in which enforced security features of the security policy are enforced. The example techniques may reduce a number of tasks that are manually performed by the IT professional by utilizing artificial intelligence and/or by automating identification, characterization, and/or mitigation of the security policy gap. The example techniques may increase a user experience and/or efficiency of an end user who accesses (e.g., utilizes) the system, for example, by reducing a likelihood that a security threat will negatively impact the end user.

By reducing the amount of time that is consumed to identify, characterize, and/or mitigate a gap in a security policy, the example techniques may reduce a cost associated with identifying, characterizing, and/or mitigating the gap in the security policy.

FIG. 1 is a block diagram of an example AI-based security policy gap summarization system 100 in accordance with an embodiment. Generally speaking, the AI-based security policy gap summarization system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the AI-based security policy gap summarization system 100 uses an AI model to summarize a gap in a security policy. Detail regarding techniques for using an AI model to summarize a gap in a security policy for security feature enforcement is provided in the following discussion.

As shown in FIG. 1, the AI-based security policy gap summarization system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the AI-based security policy gap summarization system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system. The communications associated with the computing system may include communications received by the computing system and/or communications provided (e.g., transmitted) by the computing system. An example of a communication is an electronic message. Examples of a computer security program include a Bitdefender® security program, developed and distributed by Bitdefender IPR Management Ltd.; a Norton® security program, developed and distributed by Gen Digital Inc.; an Avast® security program, developed and distributed by Avast Software S.R.O.; a McAfee® security program, developed and distributed by McAfee, LLC; and Microsoft Defender® and Entra® security programs, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline development and operations (DevOps) security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes® pods and/or clusters, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program, developed and distributed by Google Inc.; an Oracle Cloud® program, developed and distributed by Oracle Corporation; an Amazon Web Services® program, developed and distributed by Amazon.com, Inc.; a Salesforce® program, developed and distributed by Salesforce.com, Inc.; AppSource® and Azure® programs, developed and distributed by Microsoft Corporation; a GoDaddy® program, developed and distributed by GoDaddy.com LLC; and a Rackspace® program, developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include AI-based security policy gap summarization logic 108 for illustrative purposes. The AI-based security policy gap summarization logic 108 is configured to use an AI model to summarize a gap in a security policy. In an example implementation, the AI-based security policy gap summarization logic 108 determines that a subset of a plurality of reference security features is absent from a plurality of enforced security features that are enforced in a system. The plurality of reference security features define a security policy template. The plurality of enforced security features define a security policy. The AI-based security policy gap summarization logic 108 generates a summary of the subset of the plurality of reference security features using an AI model by providing a representation of the subset of the plurality of reference security features as an input to the AI model. In an aspect, the AI-based security policy gap summarization logic 108 causes the summary and an explanation to be presented via a user interface. The explanation indicates that the subset of the plurality of reference security features is absent from the plurality of enforced security features that define the security policy. The AI-based security policy gap summarization logic 108 causes the subset of the plurality of reference security features to be enforced in the system by redefining the security policy (e.g., using the summary and/or the explanation). Redefining the security policy comprises adding the subset of the plurality of reference security features to the plurality of enforced security features.

The AI-based security policy gap summarization logic 108 may be implemented in various ways to use an AI model to summarize a gap in a security policy, including being implemented in hardware, software, firmware, or any combination thereof. For example, the AI-based security policy gap summarization logic 108 may be implemented as computer program code configured to be executed in one or more processors. In another example, at least a portion of the AI-based security policy gap summarization logic 108 may be implemented as hardware logic/electrical circuitry. For instance, at least a portion of the AI-based security policy gap summarization logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the AI-based security policy gap summarization logic 108 may be (or may be included in) a computer security program and/or a cloud computing program, though the scope of the example embodiments is not limited in this respect.

The AI-based security policy gap summarization logic 108 is shown to be incorporated in the first server(s) 106A for illustrative purposes and is not intended to be limiting. It will be recognized that the AI-based security policy gap summarization logic 108 (or any portion(s) thereof) may be incorporated in any one or more of the servers 106A-106N, any one or more of the user devices 102A-102M, or any combination thereof. For example, client-side aspects of the AI-based security policy gap summarization logic 108 may be incorporated in one or more of the user devices 102A-102M, and server-side aspects of AI-based security policy gap summarization logic 108 may be incorporated in one or more of the servers 106A-106N.

Figure 2:
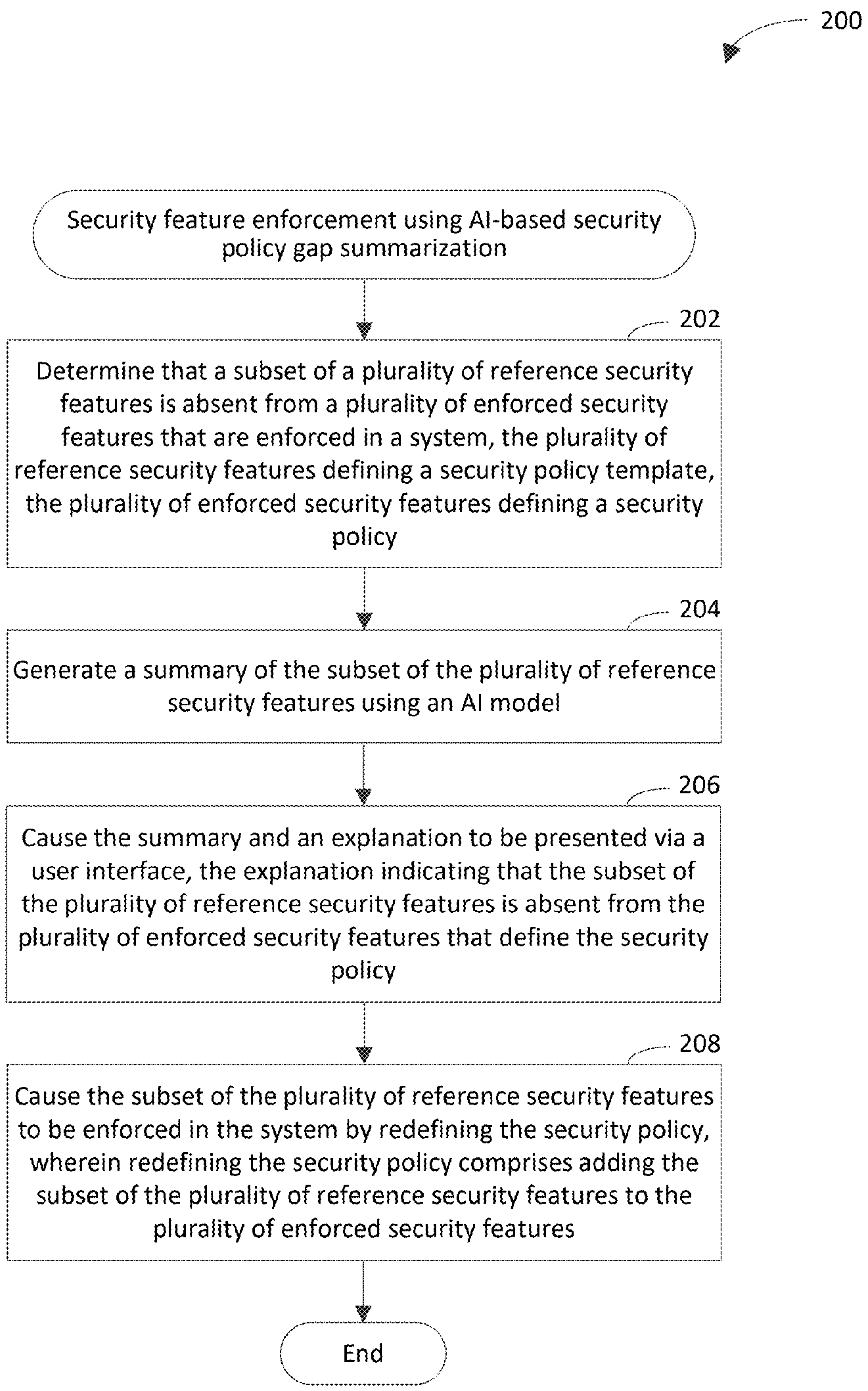
FIGS. 2-3 depict flowcharts of example methods for using an AI model to summarize a gap in a security policy for security feature enforcement in accordance with embodiments.
Figure 3:
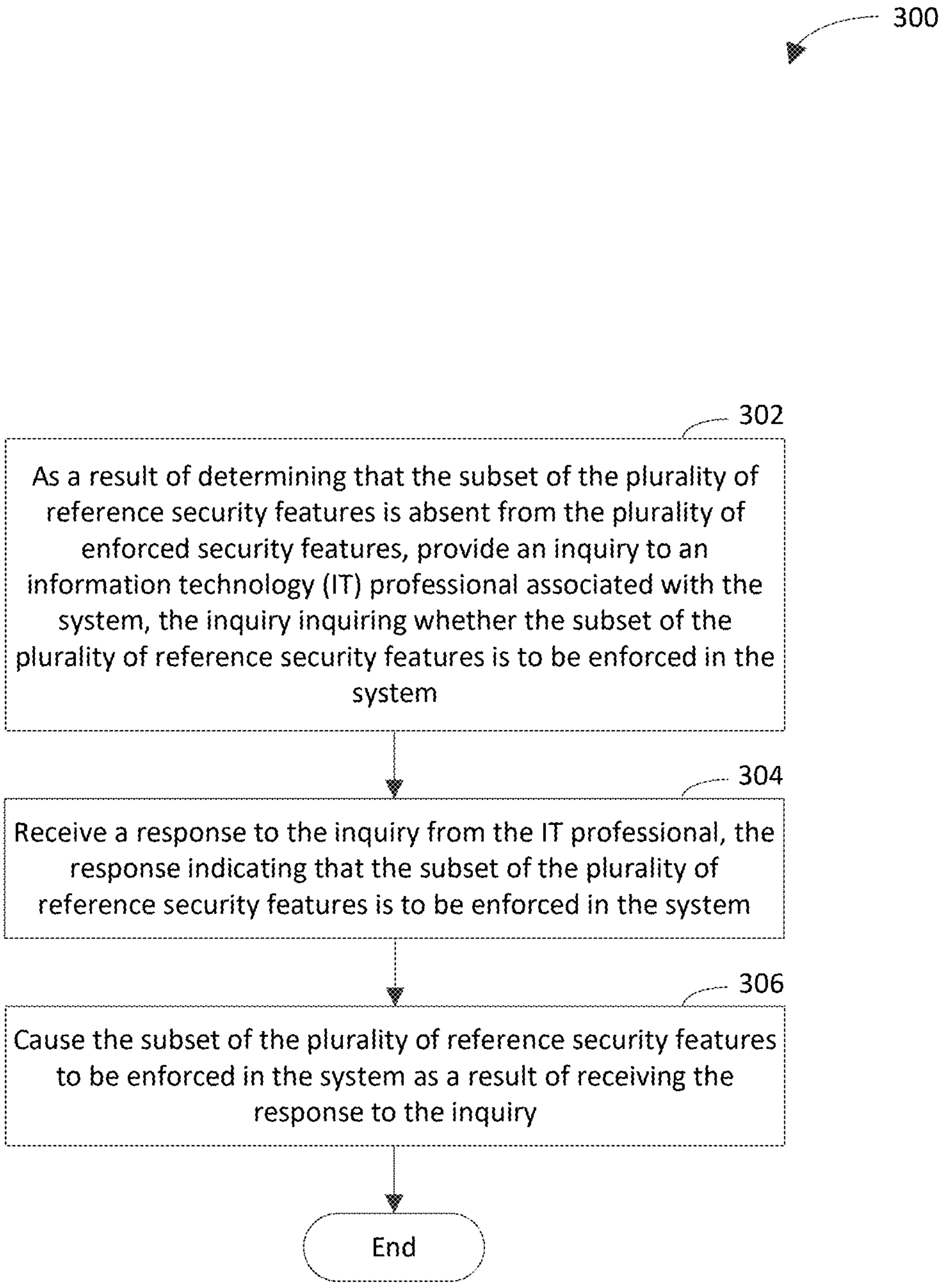
Figure 4:
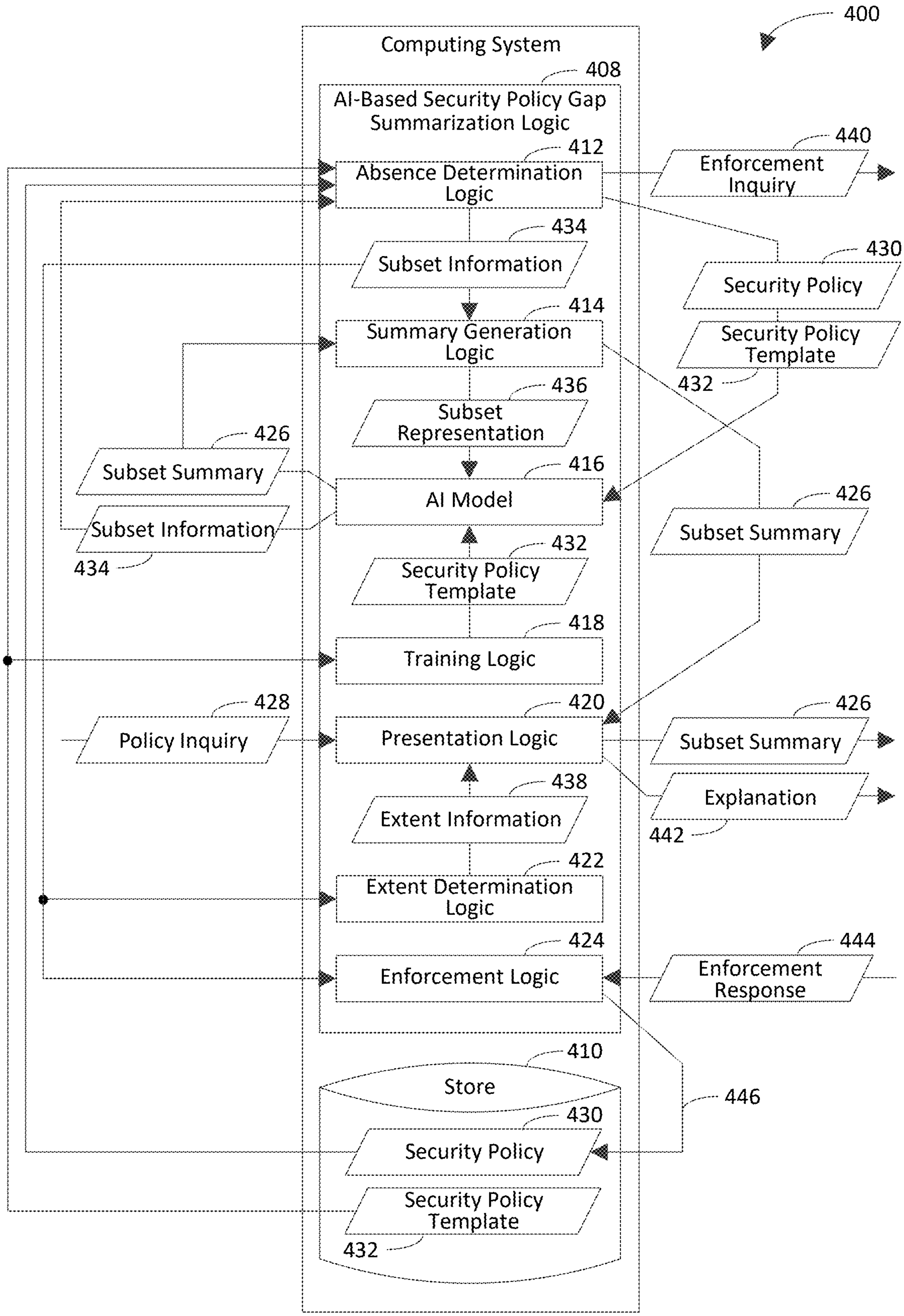
FIG. 4 is a block diagram of an example computing system in accordance with an embodiment.

FIGS. 2-3 depict flowcharts 200 and 300 of example methods for using an AI model to summarize a gap in a security policy for security feature enforcement in accordance with embodiments. Flowcharts 200 and 300 may be performed by the first server(s) 106A shown in FIG. 1, for example. For illustrative purposes, flowcharts 200 and 300 are described with respect to a computing system 400 shown in FIG. 4, which is an example implementation of the first server(s) 106A. As shown in FIG. 4, the computing system 400 includes AI-based security policy gap summarization logic 408 and a store 410. The AI-based security policy gap summarization logic 408 includes absence determination logic 412, summary generation logic 414, an AI model 416, training logic 418, presentation logic 420, extent determination logic 422, and enforcement logic 424. The store 410 may be any suitable type of store. One type of store is a database. For instance, the store 410 may be a relational database, an entity-relationship database, an object database, an object relational database, an extensible markup language (XML) database, etc. The store 410 is shown to store a security policy 430 and a security policy template 432 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, a determination is made that a subset of a plurality of reference security features is absent from a plurality of enforced security features that are enforced in a system. A reference security feature is a security feature that is configured to be used as a reference with regard to another security feature. An enforced security feature is a security feature that is enforced in a system. A security feature is a feature (e.g., a requirement or a rule) that is configured to increase security of a system and/or a user of the system. In an aspect, the security feature is implemented in code (e.g., software) and/or hardware (e.g., circuitry). The plurality of reference security features define a security policy template. The plurality of enforced security features define a security policy.

Examples of a security policy include but are not limited to a conditional access (CA) policy, an identity protection policy, an application consent policy, and an application management policy. A conditional access policy is a security policy that requires a user who seeks access to a resource to satisfy one or more criteria as a prerequisite to granting the access to the user. An identity protection policy is a security policy that requires verification and authentication of an identity of an entity that seeks access to a resource as prerequisites for granting the access to the entity. For instance, the entity may be a user or a device. An application consent policy is a security policy that defines permissions assigned to a software application with regard to accessing data. An application management policy is a security policy that governs deployment, usage, and maintenance of a software application. In an aspect, the plurality of enforced security features that define the security policy are from two or more types of security policies, such as those described above. In another aspect, the subset of the plurality of reference security features comprises security features from two or more types of security policies. In yet another aspect, the subset of the plurality of reference security features comprises any suitable number (e.g., 1, 3, 25, or 138) of the reference security features that are included in the plurality of reference security features.

In an example implementation, the absence determination logic 412 determines that the subset of the plurality of reference security features is absent from the plurality of enforced security features that are enforced in the system. The plurality of reference security features define the security policy template 432. The plurality of enforced security features define the security policy 430. In an aspect of this implementation, the absence determination logic 412 analyzes the security policy template 432 to identify the plurality of reference security features. In accordance with this aspect, the absence determination logic 412 analyzes the security policy 430 to identify the plurality of enforced security features. In further accordance with this aspect, the absence determination logic 412 compares the plurality of reference security features of the security policy template 432 and the plurality of enforced security features of the security policy 430 to identify the subset of the plurality of reference security features that is absent from the plurality of enforced security features.

The absence determination logic 412 generates subset information 434, which indicates (e.g., specifies or describes) the subset of the plurality of reference security features that is absent from the plurality of enforced security features. In an example, the subset information 434 comprises an itemized description of each reference security feature that is comprised in the subset. For instance, an itemized description of a reference security feature may indicate a restriction that is to be imposed upon a target entity (e.g., a target user or a target role), an identifier that identifies the target entity, data (e.g., a secret, such as a key or a certificate) utilized to impose the restriction, a location of the data, variable(s) utilized to impose the restriction, location(s) of the variable(s), a maximum lifetime associated with a secret, and so on. In another example, the subset information 434 comprises code that defines the reference security features that are comprised in the subset.

In an example embodiment, step 202 comprises determining that the subset of the plurality of reference security features is absent from the plurality of enforced security features using the AI model by providing an AI prompt together with contextual information as second inputs to the AI model. The AI prompt requests a determination whether the plurality of enforced security features that are enforced in the system and the plurality of reference security features are same. The contextual information comprises context for the AI prompt. The contextual information comprises the security policy and the security policy template. In an example implementation, the absence determination logic 412 determines that the subset of the plurality of reference security features is absent from the plurality of enforced security features using the AI model 416 by providing the AI prompt together with the contextual information as second inputs to the AI model 416. In accordance with this implementation, the contextual information comprises the security policy 430 and the security policy template 432. In an aspect, the absence determination logic 412 causes the AI model 416 to generate the subset information 434 based on a comparison of the security policy 430 and the security policy template 432. The subset information 434 indicates that the subset of the plurality of reference security features is absent from the plurality of enforced security features.

At step 204, a summary of the subset of the plurality of reference security features is generated using an AI model by providing a representation of the subset of the plurality of reference security features as an input to the AI model. In an aspect, the summary summarizes the representation of the subset of the plurality of reference security features. In an example implementation, the summary generation logic 414 generates a subset summary 426 using the AI model 416 by providing a subset representation 436 as an input to the AI model 416. The subset summary 426 comprises (e.g., is) the summary of the subset of the plurality of reference security features. The subset representation 436 comprises the representation of the subset of the plurality of reference security features. In an aspect the subset information 434 and the subset representation are same. In another aspect the subset information 434 and the subset representation are different. For instance, the subset representation need not necessarily comprise an entirety of the subset information 434.

In an example embodiment, step 204 comprises causing (e.g., triggering) the AI model to rank a plurality of instances of information that are comprised in the representation of the subset of the plurality of reference security features to provide a plurality of respective ranks. For instance, the respective ranks may be based on (e.g., based at least on) importance (e.g., relevance). The importance of an instance of information may correspond to an extent to which the instance of information relates to security of the system, an extent of damage that is likely to occur as a result of the instance of information not being taken into consideration for generation of the summary, and so on. In accordance with this embodiment, step 204 further comprises causing the AI model to generate the summary by deleting identified instances of information from the plurality of instances of information as a result of the identified instances having respective ranks that are less than or equal to a ranking threshold.

In another example embodiment, step 204 comprises causing the AI model to identify relationships among the reference security features in the subset using the representation of the subset of the plurality of reference security features. In accordance with this embodiment, step 204 further comprises causing the AI model to generate the summary using the relationships. In an example, the AI model uses the relationships to consolidate descriptions of attributes of the reference security features that are comprised in the subset to provide consolidated descriptions. In accordance with this example, the AI model generates the summary to comprise the consolidated descriptions (e.g., in lieu of unconsolidated descriptions on which the consolidated descriptions are based).

In yet another example embodiment, step 204 comprises causing the AI model to categorize groups of the reference security features that are comprised in the subset into respective categories based on attributes of those reference security features. In a shared attribute example, the AI model categorizes a first group of the reference security features, which are comprised in the subset and which share a first attribute, into a first category. In accordance with the shared attribute example, the AI model categorizes a second group of the reference security features, which are comprised in the subset and which share a second attribute, into a second category, and so on. In accordance with this embodiment, step 204 further comprises causing the AI model to generate the summary to comprise descriptions of the categories (in lieu of descriptions of the individual features in each category). In accordance with the shared attribute example, the descriptions of the categories are based on the shared attributes associated with the categories. For instance, the description of the first category may be based on the first attribute shared by the reference security features that are comprised in the first group. The description of the second category may be based on the second attribute shared by the reference security features that are comprised in the second group, and so on.

In still another example embodiment, generating the summary at step 204 comprises providing a first description of the subset of the plurality of reference security features, in lieu of a second description of an entirety of the plurality of enforced security features that are enforced in the system and an entirety of the plurality of reference security features, as the input to the AI model. In an aspect, the first description excludes a description of the plurality of enforced security features. In accordance with this aspect, the first description further excludes a description of reference security features in the plurality of reference security features that are not comprised in the subset of the plurality of reference security features. Accordingly, the first description may be limited to describing only reference security features that are comprised in the subset of the plurality of reference security features. In an example implementation, the subset representation 436 comprises the first description rather than (e.g., instead of) the second description.

In an example alternative embodiment, generating the summary at step 204 comprises providing the second description, which describes the entirety of the plurality of enforced security features that are enforced in the system and the entirety of the plurality of reference security features, (e.g., in lieu of only the first description of the subset of the plurality of reference security features) as the input to the AI model. In an example implementation, the subset representation 436 comprises the second description.

At step 206, the summary and an explanation are caused to be presented via a user interface. The explanation indicates that the subset of the plurality of reference security features is absent from the plurality of enforced security features that define the security policy. In an aspect, the summary and the explanation are caused to be presented via the user interface to an information technology (IT) professional associated with the system (e.g., an IT professional that manages security of the system). In an example implementation, the presentation logic 420 causes the subset summary 426 and an explanation 442 to be presented via the user interface. The explanation 442 indicates that the subset of the plurality of reference security features is absent from the plurality of enforced security features that define the security policy 430.

In an example embodiment, step 206 comprises causing the summary, the explanation, and a second summary of the plurality of enforced security features, which are enforced in the system, to be presented via the user interface.

At step 208, the subset of the plurality of reference security features is caused to be enforced in the system by redefining the security policy. Redefining the security policy comprises adding the subset of the plurality of reference security features to the plurality of enforced security features. In an example implementation, the enforcement logic 424 causes the subset of the plurality of reference security features to be enforced in the system by redefining the security policy 430, as indicated by arrow 446. In accordance with this implementation, the enforcement logic 424 redefines the security policy 430 by adding the subset of the plurality of reference security features, as indicated by the subset information 434, to the plurality of enforced security features. In an aspect, the enforcement logic 424 determines the subset of the plurality of reference security features using the subset information 434. For instance, the enforcement logic 424 may identify each reference security feature that is comprised in the subset of the plurality of reference security features by analyzing the subset information 434.

In an example conditional access embodiment, the plurality of enforced security features comprises a plurality of enforced conditional access features. In accordance with the conditional access embodiment, the subset of the plurality of reference security features comprises a reference conditional access feature. An enforced conditional access feature is a conditional access feature that is enforced in a system. A reference conditional access feature is a conditional access feature that is configured to be used as a reference with regard to another conditional access feature. A conditional access feature is a feature that relates to a requirement for a user who seeks access to a resource to satisfy one or more criteria as a prerequisite to granting the access to the user. In an aspect, the conditional access feature indicates (e.g., identifies or describes) the resource, a type of access (e.g., read, write, delete) that is sought, and/or the one or more criteria. For example, the conditional access feature may block use of a legacy protocol (e.g., a protocol that does not support multifactor authentication) to authenticate the user; require multifactor authentication for users (e.g., administrative users) that attempt to access an administrator portal, all users, users that attempt to perform a management operation (e.g., change a setting) with regard to a cloud computing program; and/or require use of a compliant device for authentication. A compliant device is a device having attributes (e.g., configuration setting(s) and/or a location) that satisfy a criterion. In further accordance with the conditional access embodiment, causing the subset of the plurality of reference security features to be enforced in the system at step 208 comprises causing the reference conditional access feature to be enforced in the system by redefining the security policy. In further accordance with the conditional access embodiment, redefining the security policy comprises adding the reference conditional access feature to the plurality of enforced conditional access features that define the security policy.

In a first example multifactor authentication (MFA) embodiment, the subset of the plurality of reference security features comprises a reference authentication feature that requires multifactor authentication for an administrative user of the system. An authentication feature is a feature that relates to authentication of an entity (e.g., a user or a device). Authentication of an entity establishes truth of an assertion that an identified entity is the entity. Multifactor authentication (MFA) is authentication in which the assertion includes two or more factors. Each factor may include something the entity knows (e.g., only the entity knows), something the entity has (e.g., only the entity has), or something the entity is (e.g., only the entity is). Examples of something the entity knows include but are not limited to a username, a password, a personal identification number (PIN), and a transaction authentication number (TAN). Examples of something the entity has include but are not limited to a personal digital assistant, a mobile phone, a hardware token, and a FIDO token. Examples of something the entity is include but are not limited to a fingerprint, an eye iris, a face identifier (ID), and a voice.

An administrative user is a user that has greater privileges (e.g., permissions) than another user (e.g., a non-administrative user) with regard to a system. In a first example, the administrative user has full access privileges, which enable the administrative user to access all files, directories, and settings in the system. In a second example, the administrative user has user management privileges, which enable the administrative user to create, modify, and delete user accounts in the system. In a third example, the administrative user has system configuration privileges, which provide the administrative user authority to change settings of the system, install and uninstall software in the system, and configure hardware in the system. In a fourth example, the administrative user has security management privileges, which enable the administrative user to set and enforce security policies (e.g., managing access controls and/or monitoring activity in the system).

In accordance with the first multifactor authentication embodiment, causing the subset of the plurality of reference security features to be enforced in the system at step 208 comprises causing the reference authentication feature, which requires the multifactor authentication for the administrative user of the system, to be enforced in the system by redefining the security policy. In further accordance with the first multifactor authentication embodiment, redefining the security policy comprises adding the reference authentication feature to the plurality of enforced conditional access features that define the security policy.

In a second example multifactor authentication embodiment, the subset of the plurality of reference security features comprises a reference authentication feature that requires multifactor authentication for a guest user of the system. A guest user of a system is a user that is granted temporary or occasional privileges with regard to a system. For instance, the guest user may be a visitor or a temporary employee. In an aspect, a scope of the privileges that are granted to the guest user is less than a scope of privileges that are granted to non-guest users of the system. In an aspect, the privileges that are granted to the guest user do not allow the guest user to customize settings of the system and/or save personal preferences with regard to the system. Accordingly, the privileges may prevent the guest user from customizing the settings of the system and/or saving the personal preferences. In yet another aspect, the privileges that are granted to the guest user do not allow the guest user to install software, change settings of the system, and/or manage other user accounts in the system. Accordingly, the privileges may prevent the guest user from installing the software, changing the settings of the system, and/or managing the other user accounts. In accordance with the second multifactor authentication embodiment, causing the subset of the plurality of reference security features to be enforced in the system at step 208 comprises causing the reference authentication feature, which requires the multifactor authentication for the guest user of the system, to be enforced in the system by redefining the security policy. In further accordance with the second multifactor authentication embodiment, redefining the security policy comprises adding the reference authentication feature to the plurality of enforced conditional access features that define the security policy.

In an example authentication technique selection embodiment, the subset of the plurality of reference security features comprises a reference authentication feature that requires a first authentication technique, which is selected from a plurality of authentication techniques, to be used to authenticate a user of the system. In an aspect, the first authentication technique requires the user to be authenticated using a particular security key (or a particular type of security key). Examples of a security key include but are not limited to a temporary access pass (TAP), a passkey, a certificate, an application programming interface (API) key, a secure shell (SSH) key, an encryption key, and a decryption key. The security key may be a symmetric key or an asymmetric key (e.g., a private key or a public key). In another aspect, the first authentication technique prohibits the user from being authenticated using a particular security key (or a particular type of security key). For instance, the first authentication technique may allow the user to be authenticated using any security key (or any type of security key) that is not prohibited by the first authentication technique. In accordance with the authentication technique selection embodiment, causing the subset of the plurality of reference security features to be enforced in the system at step 208 comprises causing the reference authentication feature, which requires the first authentication technique to be used to authenticate the user of the system, to be enforced in the system by redefining the security policy. In further accordance with the authentication technique selection embodiment, redefining the security policy comprises adding the reference authentication feature to the plurality of enforced security features that define the security policy.

In an example automation embodiment, causing the subset of the plurality of reference security features to be enforced in the system at step 208 comprises, as a result of determining that the subset of the plurality of reference security features is absent from the plurality of enforced security features at step 202, automatically adding the subset of the plurality of reference security features to the plurality of enforced security features that define the security policy.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example training embodiment, the method of flowchart 200 further includes, at a first time instance, training the AI model on the security policy template, which is defined by the plurality of reference security features. In an example implementation, at the first time instance, the training logic 418 trains the AI model 416 on the security policy template 432, which is defined by the plurality of reference security features. In accordance with the training embodiment, step 202 comprises, at a second time instance that follows the first time instance, determining that the subset of the plurality of reference security features is absent from the plurality of enforced security features using the AI model as a result of the AI model being trained on the security policy template. In further accordance with the training embodiment, the determination is made using the AI model by providing the security policy, which is defined by the plurality of enforced security features that are enforced in the system, to the AI model. In an example implementation, the absence determination logic 412 makes the determination at the second time instance using the AI model 416 by providing the security policy 430, which is defined by the plurality of enforced security features that are enforced in the system, to the AI model 416.

In an example extent embodiment, the method of flowchart 200 further includes determining extents to which identified reference security features, which are comprised (e.g., defined) in the subset of the plurality of reference security features, are to increase security of the system. In an example, the extents are numerical values. In another example, each of the extents indicates a category in a hierarchy of categories that represent respective extent ranges. In accordance with this example, the hierarchy includes a first hierarchical category representing (e.g., corresponding to) a first extent range, a second hierarchical category representing a second extent range, and so on. In further accordance with this example, an extent that is included within the first extent range indicates the first hierarchical category; an extent that is included within the second extent range indicates the second hierarchical category, and so on.

In an example implementation of the extent embodiment, the extent determination logic 422 determines the extents to which the identified reference security features are to increase the security of the system. In an aspect, the extent determination logic 422 determines the identified reference security features by analyzing the subset information 434. In another aspect, the extent determination logic 422 determines the extents to which the identified reference security features are to increase the security of the system by comparing the identified reference security features to security information, which indicates other extents to which other reference security features are to increase security of a system. For instance, the security information may cross-reference the other extents with the other reference security features. In an example of this aspect, the extent determination logic 422 performs an analysis that determines how much each of the other reference security features corresponds to each of the identified reference security features. In accordance with this example, the extent determination logic 422 determines the extent to which each of the identified reference security features is to increase the security of the system by assigning weights to the other extents based on how much the other reference security features correspond to the identified reference security feature.

It will be recognized that the extent determination logic 422 may use the AI model 416 to determine the extents to which the identified reference security features are to increase the security of the system. For example, the extent determination logic may provide an AI prompt, which requests a determination of the extents to which the identified reference security features are to increase the security of the system, and contextual information, comprising the subset information 434 and/or the security information, as inputs to the AI model 416.

The extent determination logic 422 generates extent information 438, which indicates the extents to which the identified reference security features are to increase the security of the system. In an aspect, the extent information 438 cross-references the extents with the identified reference security features.

In accordance with the extent embodiment, the explanation indicates a mapping of the identified reference security features to the extents. In an example implementation, the presentation logic 420 configures the explanation 442 to indicate the mapping of the identified reference security features to the extents based at least on (e.g., using) the extent information 438.

In a first example inquiry embodiment, the method of flowchart 200 further includes receiving an inquiry regarding the security policy from an information technology (IT) professional associated with the system. In an example implementation, the presentation logic 420 receives a policy inquiry 428 regarding the security policy 430 from the IT professional associated with the system. In accordance with the first inquiry embodiment, causing the summary and the explanation to be presented via the user interface at step 206 comprises causing a response to the inquiry to be presented to the IT professional via the user interface. The response comprises the summary of the subset of the plurality of reference security features and the explanation, which indicates that the subset of the plurality of reference security features is absent from the plurality of enforced security features that define the security policy. In an example implementation, the presentation logic 420 causes a response to the policy inquiry 428 to be presented to the IT professional via the user interface. The response to the policy inquiry 428 comprises the subset summary 426 and the explanation 442.

In a second example inquiry embodiment, the method of flowchart 200 further includes one or more of the steps shown in flowchart 300 of FIG. 3. As shown in FIG. 3, the method of flowchart 300 begins at step 302. In step 302, as a result of determining that the subset of the plurality of reference security features is absent from the plurality of enforced security features at step 202, providing an inquiry to an information technology (IT) professional associated with the system. The inquiry inquires whether the subset of the plurality of reference security features is to be enforced in the system. In an example implementation, as a result of the absence determination logic 412 determining that the subset of the plurality of reference security features is absent from the plurality of enforced security features at step 202, the absence determination logic 412 provides an enforcement inquiry 440 to the IT professional associated with the system. The enforcement inquiry 440 inquires whether the subset of the plurality of reference security features is to be enforced in the system.

At step 304, a response to the inquiry is received from the IT professional. The response indicates that the subset of the plurality of reference security features is to be enforced in the system. In an example implementation, the enforcement logic 424 receives an enforcement response 444 from the IT professional in response to the enforcement inquiry 440. The enforcement response 444 indicates that the subset of the plurality of reference security features is to be enforced in the system.

At step 306, the subset of the plurality of reference security features is caused to be enforced in the system as a result of receiving the response to the inquiry. In an aspect, step 208 of flowchart 200 includes step 306. In an example implementation, the enforcement logic 424 causes the subset of the plurality of reference security features to be enforced in the system as a result of receiving the enforcement response 444.

Any one or more of the operations described herein may be performed using the AI model 416. In a first example prompting embodiment, the absence determination logic 412 causes (e.g., triggers) the AI model 416 to analyze (e.g., develop and/or refine an understanding of) a first AI prompt, first contextual information, relationships between any of the foregoing, and confidences in those relationships. The first AI prompt inquires whether any reference security features in the plurality of reference security features that define the security policy template are absent (e.g., missing) from the plurality of enforced security features that define the security policy. The first contextual information comprises the security policy 430 and the security policy template 432. For example, the absence determination logic 412 may cause the AI model 416 to compare attributes of the first AI prompt and the first contextual information (including the security policy 430 and the security policy template 432) using artificial intelligence to generate the subset information 434. The first contextual information may further include sample AI prompt(s) and sample contextual information (e.g., sample security policies, sample security policy templates, and/or sample subset information associated with the sample security policies and the sample security policy templates).

In a second example prompting embodiment, the summary generation logic 414 causes (e.g., triggers) the AI model 416 to analyze (e.g., develop and/or refine an understanding of) a second AI prompt, second contextual information, relationships between any of the foregoing, and confidences in those relationships. The second AI prompt requests a summary of the subset of the plurality of reference security features. The second contextual information includes the subset representation 436. For example, the summary generation logic 414 may cause the AI model 416 to compare attributes of the second AI prompt and the second contextual information (including the subset representation 436) using artificial intelligence to generate the subset summary 426. The second contextual information may further include sample AI prompt(s) and sample contextual information (e.g., sample subset representations and/or sample subset summaries associated with the sample subset representations).

In a third example prompting embodiment, the extent determination logic 422 causes (e.g., triggers) the AI model 416 to analyze (e.g., develop and/or refine an understanding of) a third AI prompt, third contextual information, relationships between any of the foregoing, and confidences in those relationships. The third AI prompt requests a determination of extents to which the identified reference security features, which are comprised in the subset of the plurality of reference security features, are to increase the security of the system. The third contextual information includes the subset information 434 and/or security information, which indicates other extents to which other reference security features are to increase security of a system. For example, the extent determination logic 422 may cause the AI model 416 to compare attributes of the third AI prompt and the third contextual information (including the subset information 434 and/or the security information) using artificial intelligence to generate the extent information 438. The third contextual information may further include sample AI prompt(s) and sample contextual information (e.g., sample subset information, sample security information, and/or sample extent information associated with the sample subset information).

It will be recognized that the training logic 418 may be used in combination with or in lieu of the absence determination logic 412, the summary generation logic 414, and/or the extent determination logic 422 to perform the operations described above with regard to the respective first, second, and third prompting embodiments.

In some example embodiments, the AI model 416 includes a neural network that uses the artificial intelligence to determine (e.g., predict) relationships between any of the AI prompts described herein and any of the corresponding contextual information and confidences in the relationships. The neural network uses those relationships to generate the corresponding AI responses. For example, attributes of the AI prompt, the contextual information, and potentially example AI prompt(s) and example AI response(s) to the AI prompt(s) may be compared to determine similarities and differences between those attributes. In accordance with this example, the neural network may use those similarities and differences to generate the corresponding AI responses.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the absence determination logic 412, the summary generation logic 414, the training logic 418, and/or the extent determination logic 422 employs a feed forward neural network to train the AI model 416, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a task-specific model by utilizing information, such as AI prompts, contextual information, relationships between any of the foregoing, and AI-based confidences that are derived therefrom. Examples of a task-specific model include but are not limited to an absence determination model (e.g., to determine whether any reference security features that define a security policy template are absent from enforced security features that define a security policy), a summary generation model (e.g., to generate a summary of a subset of reference security features that define the security as a result of the subset of the reference security features being absent from security features that define a security policy, and an extent determination model (e.g., to determine extents to which identified reference security features in a subset of reference security features that define a security policy template are to increase security of a system).

In example embodiments, the absence determination logic 412, the summary generation logic 414, and/or the extent determination logic 422 includes training logic, and the AI model 416 includes inference logic. The training logic (e.g., training logic 418) is configured to train an AI algorithm that the inference logic uses to determine (e.g., infer) the AI-based confidences. For instance, the training logic may provide sample AI prompts and sample contextual information as inputs to the AI algorithm to train the AI algorithm. The sample data may be labeled. The AI algorithm may be configured to derive relationships between the features (e.g., the AI prompt and the contextual information) and the resulting AI-based confidences. The inference logic is configured to utilize the AI algorithm, which is trained by the training logic, to determine the AI-based confidence when the features are provided as inputs to the algorithm.

In an example embodiment, the AI model 416 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the AI model 416 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In yet another example embodiment, the AI model 416 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of one or more AI prompts, one or more instances of contextual information, and/or one or more AI responses. In an aspect of this embodiment, the AI model 416 generates an AI response to an AI prompt described herein using an embedding model. In an example of this aspect, the embedding model is an encoder-only model. One example of an encoder-only model is the bidirectional encoder representations from transformers (BERT™) model, which is developed and distributed by Google LLC. In another example of this aspect, the embedding model is a decoder-only model. In yet another example of this aspect, the embedding model is an encoder-decoder model. One example of an encoder-decoder model is the FLAN-T5™ model, which is developed and distributed by Google LLC.

In still another example embodiment, the AI model 416 includes multiple types of AI models. Weights may be applied to the responses generated by the respective types of AI models. For example, the AI model 416 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The AI model 416 may combine (e.g., sum) the first weighted response and the second weighted response to generate a response of the AI model 416.

In an example clustering embodiment, the summary generation logic 414 generates the subset summary 426 (i.e., the summary of the subset of the plurality of reference security features that define the security policy template 432) using the AI model 416 by causing the AI model 416 to cluster (e.g., partition) respective groups of identified reference security features, which are included in the subset of the plurality of reference security features, into respective categories (e.g., clusters). In an aspect, the AI model 416 clusters the respective groups into the respective categories as a result of the identified reference security features in each group having attributes that satisfy a criterion. For example, the identified reference security features in each group may share a common (e.g., same) attribute or combination of attributes.

In accordance with the clustering embodiment, the AI model 416 defines the groups of the identified reference security features using a clustering algorithm or a gradient algorithm. In an example clustering embodiment, the AI model 416 clusters the groups of the identified reference security features into respective clusters by analyzing attributes of the identified reference security features (e.g., embeddings that represent the identified reference security features) using a clustering algorithm. The clustering algorithm may be density-based, distribution-based, centroid-based, or hierarchical-based. A density-based clustering algorithm clusters data points (e.g., the subsets of the communications), which are included in an area having a relatively high concentration of data points that is surrounded by area(s) having a relatively low concentration of data points, into a cluster. A distribution-based clustering algorithm clusters data points into clusters based on a distance of each data point to the center of each of multiple clusters, such that the data point is included in the cluster having a center that is closer to the data point than the center of each other cluster. A centroid-based clustering algorithm clusters data points into clusters based on a squared distance of each data point from each of multiple centroids in the data, such that the data point is included in the cluster corresponding to the centroid with the shortest squared distance to the data point. A hierarchical-based clustering algorithm clusters data points based on which of multiple hierarchical levels of a hierarchy includes the data points. For example, data points corresponding to a first hierarchical level are clustered into a first cluster; data points corresponding to a second hierarchical level are clustered into a second cluster, and so on.

In an aspect of the clustering embodiment, the groups of the identified reference security features are clustered into the respective clusters as a result of the groups of the identified reference security features corresponding to respective attributes (e.g., functionalities). For example, a first group of identified reference security features may be clustered into a first cluster as a result of the identified reference security features in the first group sharing first attribute(s) (e.g., a first functionality). A second group of identified reference security features may be clustered into a second cluster as a result of the identified reference security features in the second group sharing second attribute(s) (e.g., a second functionality), and so on. In another example, each cluster may consist of a designated (e.g., fixed) number (e.g., 2, 3, or 10) of the identified reference security features.

In another aspect of the clustering embodiment, the clustering algorithm is a K-means clustering algorithm. The K-means clustering algorithm is an unsupervised learning centroid-based clustering algorithm. In an aspect, the K-means clustering algorithm attempts to minimize the variance of data points within each cluster.

In yet another aspect of the clustering embodiment, the clustering algorithm is a density-based spatial clustering of applications with noise (DBSCAN) clustering algorithm. As indicated by its name, the DBSCAN clustering algorithm is a density-based clustering algorithm. The DBSCAN clustering algorithm defines arbitrarily shaped clusters based on density of data points in regions that are separated by areas of low-density.

Other examples of a clustering algorithm include but are not limited to a Gaussian mixture clustering algorithm, a balance iterative reducing and clustering using hierarchies (BIRCH) clustering algorithm, an affinity propagation clustering algorithm, a mean-shifting clustering algorithm, an ordering points to identify the clustering structure (OPTICS) clustering algorithm, and an agglomerative hierarchy clustering algorithm.

In an example embedding embodiment, the AI model 416 generates the subset summary 426 using an embedding model. In an aspect of this embodiment, the embedding model is an encoder-only model. One example of an encoder-only model is the bidirectional encoder representations from transformers (BERT™) model, which is developed and distributed by Google LLC. In another aspect of this embodiment, the embedding model is a decoder-only model. In yet another aspect of this embodiment, the embedding model is an encoder-decoder model. One example of an encoder-decoder model is the FLAN-T5™ model, which is developed and distributed by Google LLC.

In accordance with the embedding embodiment, the AI model 416 determines relationships between the identified reference security features (e.g., attributes of the identified reference security features), which are included in the subset of the plurality of reference security features that define the security policy template 432, based on distances between embeddings (a.k.a. tokens) of the identified reference security features. An embedding is a numerical representation of data (e.g., one or more of the identified reference security features or a representation (e.g., description) thereof). For instance, the embedding may be generated by converting the data (e.g., text) into a vector (e.g., an array of numbers). In an aspect, the embedding represents the meaning and the context of the data. In accordance with this aspect, the distance between a first embedding of first identified reference security features(s) and a second embedding of second identified reference security feature(s) corresponds to a strength of a relationship (e.g., similarity) between the first identified reference security feature(s) and the second identified reference security feature(s). For instance, the distance being relatively shorter indicates that the first identified reference security features(s) correspond to the second identified reference security feature(s) to a relatively greater extent, whereas the distance being relatively longer indicates that the first identified reference security features(s) correspond to the second identified reference security feature(s) to a relatively lesser extent.

The distance between a first embedding and a second embedding may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E=[(a-x)^2+(b-y)^2]^(1/2)$. In another example, the Euclidian distance, $D_E$, between two 3-dimensional vectors (a, b, c) and (x, y, z) may be represented as $D_E=[(a-x)^2+(b-y)^2+(c-z)^2]^(1/2)$. A Manhattan distance between two vectors is a sum of absolute differences between corresponding components of the vectors. For example, the Manhattan distance, $D_M$, between two 2-dimensional vectors (a, b) and (x, y) may be represented as $D_M=Abs(a-x)+Abs(b-y)$. In another example, the Manhattan distance, $D_M$, between two 3-dimensional vectors (a, b, c) and (x, y, z) may be represented as $D_M=Abs(a-x)+Abs(b-y)+Abs(c-z)$. A Cosine distance between two vectors is equal to a dot product of the vectors divided by a product of the magnitudes of the vectors. Accordingly, the Cosine distance, $D_C$, between vectors X and Y may be represented as $D_C=(X\cdot Y)/(\|X\|*\|Y\|)$.

An embedding that represents multiple identified reference security features may be a combination (e.g., average or median) of respective embeddings of the identified reference security features.

It will be recognized that the computing system 400 may not include one or more of the AI-based security policy gap summarization logic 408, the store 410, the absence determination logic 412, the summary generation logic 414, the AI model 416, the training logic 418, the presentation logic 420, the extent determination logic 422, and/or the enforcement logic 424. Furthermore, the computing system 400 may include components in addition to or in lieu of the AI-based security policy gap summarization logic 408, the store 410, the absence determination logic 412, the summary generation logic 414, the AI model 416, the training logic 418, the presentation logic 420, the extent determination logic 422, and/or the enforcement logic 424.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the AI-based security policy gap summarization logic 108, the AI-based security policy gap summarization logic 408, the absence determination logic 412, the summary generation logic 414, the AI model 416, the training logic 418, the presentation logic 420, the extent determination logic 422, the enforcement logic 424, flowchart 200, and/or flowchart 300 may be implemented in hardware, software, firmware, or any combination thereof.

For example, any one or more of the AI-based security policy gap summarization logic 108, the AI-based security policy gap summarization logic 408, the absence determination logic 412, the summary generation logic 414, the AI model 416, the training logic 418, the presentation logic 420, the extent determination logic 422, the enforcement logic 424, flowchart 200, and/or flowchart 300 may be implemented, at least in part, as computer program code configured to be executed in one or more processors.

In another example, any one or more of the AI-based security policy gap summarization logic 108, the AI-based security policy gap summarization logic 408, the absence determination logic 412, the summary generation logic 414, the AI model 416, the training logic 418, the presentation logic 420, the extent determination logic 422, the enforcement logic 424, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
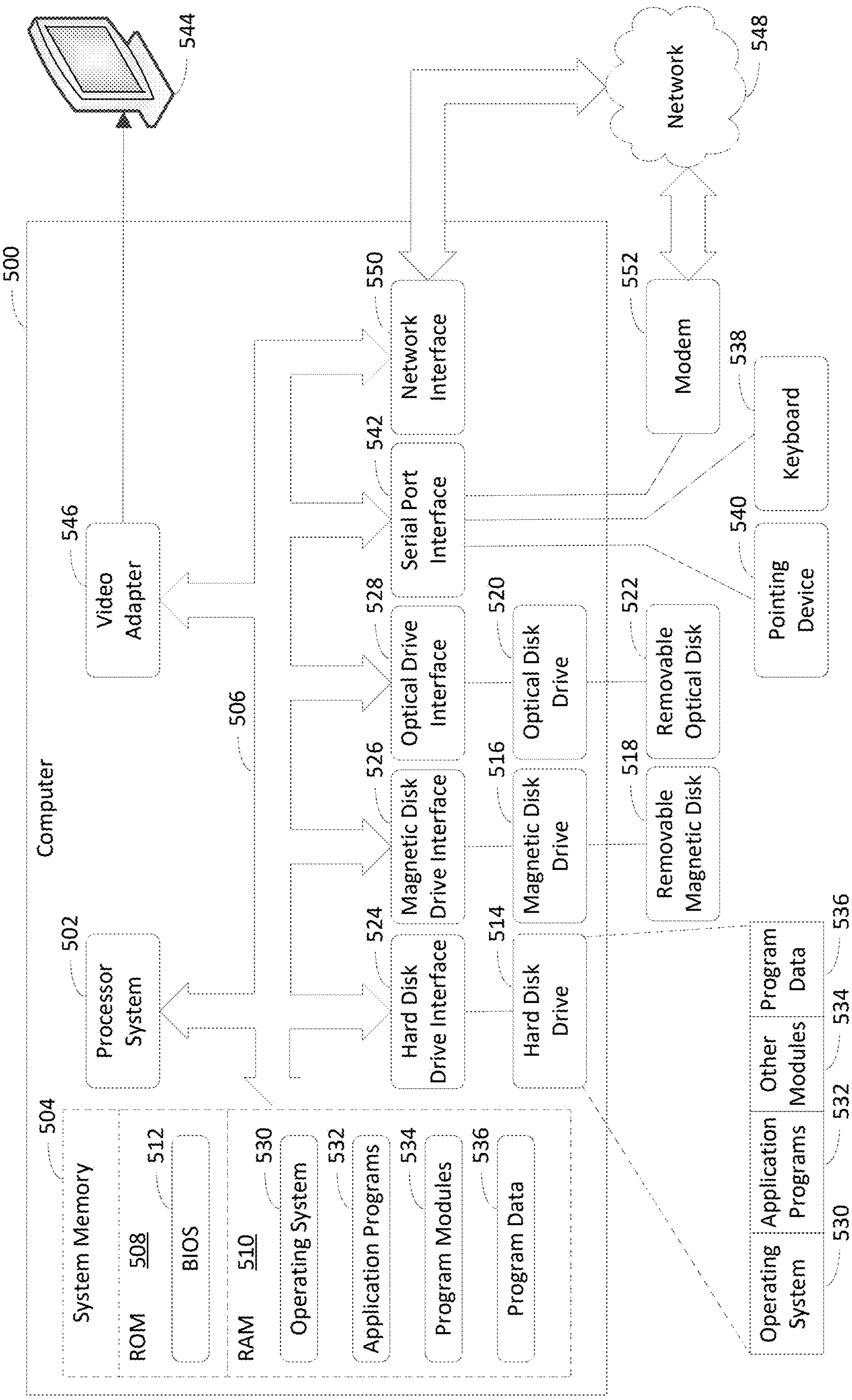
FIG. 5 depicts an example computer in which embodiments may be implemented.

II. Further Discussion of Some Example Embodiments (A1) An example system (FIG. 1, 102A-102M, 106A-106N; FIG. 4, 400; FIG. 5, 500) comprises a processor system (FIG. 5, 502) and a memory (FIG. 5, 504, 508, 510) that stores computer-executable instructions. The computer-executable instructions are executable by the processor system to at least determine (FIG. 2, 202) that a subset of a plurality of reference security features is absent from a plurality of enforced security features that are enforced in a system. The plurality of reference security features define a security policy template (432). The plurality of enforced security features define a security policy (430). The computer-executable instructions are executable by the processor system further to at least generate (FIG. 2, 204) a summary (FIG. 4, 426) of the subset of the plurality of reference security features using an artificial intelligence model (FIG. 4, 416) by providing a representation (FIG. 4, 436) of the subset of the plurality of reference security features as an input to the artificial intelligence model. The computer-executable instructions are executable by the processor system further to at least cause (FIG. 2, 206) the summary and an explanation (FIG. 4, 442) to be presented via a user interface. The explanation indicates that the subset of the plurality of reference security features is absent from the plurality of enforced security features that define the security policy. The computer-executable instructions are executable by the processor system further to at least cause (FIG. 2, 208) the subset of the plurality of reference security features to be enforced in the system by redefining the security policy. Redefining the security policy comprises adding the subset of the plurality of reference security features to the plurality of enforced security features.

(A2) In the example system of A1, wherein the computer-executable instructions are executable by the processor system to at least: determine that the subset of the plurality of reference security features is absent from the plurality of enforced security features using the artificial intelligence model by providing an AI prompt together with contextual information as second inputs to the artificial intelligence model, the AI prompt requesting a determination whether the plurality of enforced security features that are enforced in the system and the plurality of reference security features are same, the contextual information comprising context for the AI prompt, the contextual information comprising the security policy and the security policy template.

(A3) In the example system of any of A1-A2, wherein the computer-executable instructions are executable by the processor system to at least: at a first time instance, train the artificial intelligence model on the security policy template, which is defined by the plurality of reference security features; and at a second time instance that follows the first time instance, determine that the subset of the plurality of reference security features is absent from the plurality of enforced security features using the artificial intelligence model as a result of the artificial intelligence model being trained on the security policy template by providing the security policy, which is defined by the plurality of enforced security features that are enforced in the system, to the artificial intelligence model.

(A4) In the example system of any of A1-A3, wherein the computer-executable instructions are executable by the processor system to generate the summary of the subset of the plurality of reference security features using the artificial intelligence model by performing the following operation: provide a first description of the subset of the plurality of reference security features, in lieu of a second description of an entirety of the plurality of enforced security features that are enforced in the system and an entirety of the plurality of reference security features, as the input to the artificial intelligence model.

(A5) In the example system of any of A1-A4, wherein the plurality of enforced security features comprises a plurality of enforced conditional access features; wherein the subset of the plurality of reference security features comprises a reference conditional access feature; and wherein the computer-executable instructions are executable by the processor system to at least: cause the reference conditional access feature to be enforced in the system by redefining the security policy, wherein redefining the security policy comprises adding the reference conditional access feature to the plurality of enforced conditional access features that define the security policy.

(A6) In the example system of any of A1-A5, wherein the subset of the plurality of reference security features comprises a reference authentication feature that requires multifactor authentication for an administrative user of the system; and wherein the computer-executable instructions are executable by the processor system to at least: cause the reference authentication feature, which requires the multifactor authentication for the administrative user of the system, to be enforced in the system by redefining the security policy, wherein redefining the security policy comprises adding the reference authentication feature to the plurality of enforced conditional access features that define the security policy.

(A7) In the example system of any of A1-A6, wherein the subset of the plurality of reference security features comprises a reference authentication feature that requires multifactor authentication for a guest user of the system; and wherein the computer-executable instructions are executable by the processor system to at least: cause the reference authentication feature, which requires the multifactor authentication for the guest user of the system, to be enforced in the system by redefining the security policy, wherein redefining the security policy comprises adding the reference authentication feature to the plurality of enforced conditional access features that define the security policy.

(A8) In the example system of any of A1-A7, wherein the subset of the plurality of reference security features comprises a reference authentication feature that requires a first authentication technique, which is selected from a plurality of authentication techniques, to be used to authenticate a user of the system; and wherein the computer-executable instructions are executable by the processor system to at least: cause the reference authentication feature, which requires the first authentication technique to be used to authenticate the user of the system, to be enforced in the system by redefining the security policy, wherein redefining the security policy comprises adding the reference authentication feature to the plurality of enforced security features that define the security policy.

(A9) In the example system of any of A1-A8, wherein the computer-executable instructions are executable by the processor system to at least: receive an inquiry regarding the security policy from an information technology (IT) professional associated with the system; and cause a response to the inquiry to be presented to the IT professional via the user interface, the response comprising the summary of the subset of the plurality of reference security features and the explanation, which indicates that the subset of the plurality of reference security features is absent from the plurality of enforced security features that define the security policy.

(A10) In the example system of any of A1-A9, wherein the computer-executable instructions are executable by the processor system to at least: as a result of a determination that the subset of the plurality of reference security features is absent from the plurality of enforced security features, provide an inquiry to an information technology (IT) professional associated with the system, the inquiry inquiring whether the subset of the plurality of reference security features is to be enforced in the system; receive a response to the inquiry from the IT professional, the response indicating that the subset of the plurality of reference security features is to be enforced in the system; and cause the subset of the plurality of reference security features to be enforced in the system as a result of receiving the response to the inquiry.

(A11) In the example system of any of A1-A10, wherein the computer-executable instructions are executable by the processor system to at least: as a result of a determination that the subset of the plurality of reference security features is absent from the plurality of enforced security features, automatically add the subset of the plurality of reference security features to the plurality of enforced security features that define the security policy.

(A12) In the example system of any of A1-A11, wherein the computer-executable instructions are executable by the processor system to at least: cause the summary, the explanation, and a second summary of the plurality of enforced security features, which are enforced in the system, to be presented via the user interface.

(A13) In the example system of any of A1-A12, wherein the computer-executable instructions are executable by the processor system further to at least: determine extents to which identified reference security features, which are comprised in the subset of the plurality of reference security features, are to increase security of the system; wherein the explanation indicates a mapping of the identified reference security features to the extents.

(B1) An example method is implemented by a computing system (FIG. 1, 102A-102M, 106A-106N; FIG. 4, 400; FIG. 5, 500). The method comprises performing a comparison of a security policy (FIG. 4, 430), which comprises a plurality of enforced security features that are enforced in a system, and a security policy template (FIG. 4, 432), which comprises a plurality of reference security features. Performing the comparison comprises determining (FIG. 2, 202) that a subset of the plurality of reference security features is absent from the plurality of enforced security features. The method further comprises causing an artificial intelligence model (FIG. 4, 416) to generate (FIG. 2, 204) a summary (FIG. 4, 426) of the subset of the plurality of reference security features by providing a representation (FIG. 4, 436) of the subset of the plurality of reference security features as an input to the artificial intelligence model. The method further comprises causing (FIG. 2, 206) the summary and an explanation (FIG. 4, 442) to be presented via a user interface. The explanation indicates that the subset of the plurality of reference security features is absent from the plurality of enforced security features in the security policy. The method further comprises causing (FIG. 2, 208) the subset of the plurality of reference security features to be enforced in the system by adding the subset of the plurality of reference security features to the plurality of enforced security features in the security policy.

(B2) In the example method of B1, wherein performing the comparison of the security policy and the security policy template comprises: performing the comparison of the security policy and the security policy template using the artificial intelligence model by providing an AI prompt together with contextual information as second inputs to the artificial intelligence model, the AI prompt requesting a determination whether the security policy and the security policy template are same, the contextual information comprising context for the AI prompt, the contextual information comprising the security policy and the security policy template.

(B3) In the example method of any of B1-B2, further comprising: at a first time instance, training the artificial intelligence model on the security policy template, which comprises the plurality of reference security features; wherein performing the comparison of the security policy and the security policy template comprises: at a second time instance that follows the first time instance, performing the comparison of the security policy and the security policy template using the artificial intelligence model as a result of the artificial intelligence model being trained on the security policy template by providing the security policy, which comprises the plurality of enforced security features that are enforced in the system, to the artificial intelligence model.

(B4) In the example method of any of B1-B3, wherein causing the artificial intelligence model to generate the summary of the subset of the plurality of reference security features comprises: providing a first description of the subset of the plurality of reference security features, in lieu of a second description of an entirety of the plurality of enforced security features that are enforced in the system and an entirety of the plurality of reference security features, as the input to the artificial intelligence model.

(B5) In the example method of any of B1-B4, wherein the plurality of enforced security features comprises a plurality of enforced conditional access features; wherein the subset of the plurality of reference security features comprises a reference conditional access feature; and wherein causing the subset of the plurality of reference security features to be enforced in the system comprises: causing the reference conditional access feature to be enforced in the system by adding the reference conditional access feature to the plurality of enforced conditional access features in the security policy.

(B6) In the example method of any of B1-B5, wherein the subset of the plurality of reference security features comprises a reference authentication feature that requires multifactor authentication for an administrative user of the system; and wherein causing the subset of the plurality of reference security features to be enforced in the system comprises: causing the reference authentication feature, which requires the multifactor authentication for the administrative user of the system, to be enforced in the system by adding the reference authentication feature to the plurality of enforced conditional access features in the security policy.

(B7) In the example method of any of B1-B6, wherein the subset of the plurality of reference security features comprises a reference authentication feature that requires multifactor authentication for a guest user of the system; and wherein causing the subset of the plurality of reference security features to be enforced in the system comprises: causing the reference authentication feature, which requires the multifactor authentication for the guest user of the system, to be enforced in the system by adding the reference authentication feature to the plurality of enforced conditional access features in the security policy.

(B8) In the example method of any of B1-B7, wherein the subset of the plurality of reference security features comprises a reference authentication feature that requires a first authentication technique, which is selected from a plurality of authentication techniques, to be used to authenticate a user of the system; and wherein causing the subset of the plurality of reference security features to be enforced in the system comprises: causing the reference authentication feature, which requires the first authentication technique to be used to authenticate the user of the system, to be enforced in the system by adding the reference authentication feature to the plurality of enforced security features in the security policy.

(B9) In the example method of any of B1-B8, further comprising: receiving an inquiry regarding the security policy from an information technology (IT) professional associated with the system; wherein causing the summary and the explanation to be presented via the user interface comprises: causing a response to the inquiry to be presented to the IT professional via the user interface, the response comprising the summary of the subset of the plurality of reference security features and the explanation, which indicates that the subset of the plurality of reference security features is absent from the plurality of enforced security features in the security policy.

(B10) In the example method of any of B1-B9, further comprising: as a result of determining that the subset of the plurality of reference security features is absent from the plurality of enforced security features, providing an inquiry to an information technology (IT) professional associated with the system, the inquiry inquiring whether the subset of the plurality of reference security features is to be enforced in the system; and receiving a response to the inquiry from the IT professional, the response indicating that the subset of the plurality of reference security features is to be enforced in the system; wherein causing the subset of the plurality of reference security features to be enforced in the system comprises: causing the subset of the plurality of reference security features to be enforced in the system as a result of receiving the response to the inquiry.

(B11) In the example method of any of B1-B10, wherein causing the subset of the plurality of reference security features to be enforced in the system comprises: as a result of determining that the subset of the plurality of reference security features is absent from the plurality of enforced security features, automatically adding the subset of the plurality of reference security features to the plurality of enforced security features in the security policy.

(B12) In the example method of any of B1-B11, wherein causing the summary and the explanation to be presented via the user interface comprises: causing the summary, the explanation, and a second summary of the plurality of enforced security features, which are enforced in the system, to be presented via the user interface.

(B13) In the example method of any of B1-B12, further comprising: determining extents to which identified reference security features, which are comprised in the subset of the plurality of reference security features, are to increase security of the system; wherein the explanation indicates a mapping of the identified reference security features and the extents.

(C1) An example computer program product (FIG. 5, 518, 522) comprises a computer-readable storage medium having instructions recorded thereon for enabling a processor-based system (FIG. 1, 102A-102M, 106A-106N; FIG. 4, 400; FIG. 5, 500) to perform operations. The operations comprise determining (FIG. 2, 202) that a subset of a plurality of reference security features that define a security policy template (FIG. 4, 432) is absent from a plurality of enforced security features that define a security policy (FIG. 4, 430), which is enforced in a system, using an artificial intelligence model (FIG. 4, 416) by providing the security policy and the security policy template as first inputs to the artificial intelligence model. The operations further comprise generating (FIG. 2, 204) a summary (FIG. 4, 426) of the subset of the plurality of reference security features using the artificial intelligence model by providing a representation (FIG. 4, 436) of the subset of the plurality of reference security features as a second input to the artificial intelligence model. The operations further comprise causing (FIG. 2, 208) the subset of the plurality of reference security features to be enforced in the system by redefining the security policy using the summary of the subset of the plurality of reference security features. Redefining the security policy comprises adding the subset of the plurality of reference security features to the plurality of enforced security features.

III. Example Computer System

FIG. 5 depicts an example computer 500 in which embodiments may be implemented. Any one or more of the user devices 102A-102M and/or any one or more of the servers 106A-106N shown in FIG. 1 and/or the computing system 400 shown in FIG. 4 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processor system 502, a system memory 504, and a bus 506 that couples various system components including system memory 504 to processor system 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the AI-based security policy gap summarization logic 108, the AI-based security policy gap summarization logic 408, the absence determination logic 412, the summary generation logic 414, the AI model 416, the training logic 418, the presentation logic 420, the extent determination logic 422, the enforcement logic 424, flowchart 200 (including any step of flowchart 200), and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processor system 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface 550 (e.g., a network or adapter), a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

determine that a subset of a plurality of reference security features is absent from a plurality of enforced security features, which are enforced in a system, using an artificial intelligence model by providing a security policy and a security policy template as first inputs to the artificial intelligence model, the plurality of reference security features defining the security policy template, the plurality of enforced security features defining the security policy;

generate a summary of the subset of the plurality of reference security features using an artificial intelligence model by providing a representation of the subset of the plurality of reference security features as a second input to the artificial intelligence model;

determine extents to which identified reference security features, which are comprised in the subset of the plurality of reference security features, are to increase security of the system;

cause the summary and an explanation to be presented via a user interface, the explanation indicating that the subset of the plurality of reference security features is absent from the plurality of enforced security features and indicating a mapping of the identified reference security features to the extents; and cause the subset of the plurality of reference security features to be enforced in the system by redefining the security policy, wherein redefining the security policy comprises adding the subset of the plurality of reference security features to the plurality of enforced security features.

2. The system of claim 1, wherein the plurality of enforced security features comprises a plurality of enforced conditional access features;

wherein the subset of the plurality of reference security features comprises a reference conditional access feature; and wherein the computer-executable instructions are executable by the processor system to at least:

cause the reference conditional access feature to be enforced in the system by redefining the security policy, wherein redefining the security policy comprises adding the reference conditional access feature to the plurality of enforced conditional access features that define the security policy.

3. The system of claim 1, wherein the subset of the plurality of reference security features comprises a reference authentication feature that requires multifactor authentication for an administrative user of the system; and wherein the computer-executable instructions are executable by the processor system to at least:

cause the reference authentication feature, which requires the multifactor authentication for the administrative user of the system, to be enforced in the system by redefining the security policy, wherein redefining the security policy comprises adding the reference authentication feature to the plurality of enforced conditional access features that define the security policy.

4. The system of claim 1, wherein the subset of the plurality of reference security features comprises a reference authentication feature that requires multifactor authentication for a guest user of the system; and wherein the computer-executable instructions are executable by the processor system to at least:

cause the reference authentication feature, which requires the multifactor authentication for the guest user of the system, to be enforced in the system by redefining the security policy, wherein redefining the security policy comprises adding the reference authentication feature to the plurality of enforced conditional access features that define the security policy.

5. The system of claim 1, wherein the subset of the plurality of reference security features comprises a reference authentication feature that requires a first authentication technique, which is selected from a plurality of authentication techniques, to be used to authenticate a user of the system; and wherein the computer-executable instructions are executable by the processor system to at least:

cause the reference authentication feature, which requires the first authentication technique to be used to authenticate the user of the system, to be enforced in the system by redefining the security policy, wherein redefining the security policy comprises adding the reference authentication feature to the plurality of enforced security features that define the security policy.

6. The system of claim 1, wherein the computer-executable instructions are executable by the processor system to at least:

as a result of a determination that the subset of the plurality of reference security features is absent from the plurality of enforced security features, automatically add the subset of the plurality of reference security features to the plurality of enforced security features that define the security policy.

7. The system of claim 1, wherein the computer-executable instructions are executable by the processor system to at least:

cause the summary, the explanation, and a second summary of the plurality of enforced security features, which are enforced in the system, to be presented via the user interface.

8. A method implemented by a computing system, the method comprising:

causing an artificial intelligence model to perform a comparison of a security policy, which comprises a plurality of enforced security features that are enforced in a system, and a security policy template, which comprises a plurality of reference security features, by providing the security policy and the security policy template as first inputs to the artificial intelligence model, wherein performance of the comparison comprises determining that a subset of the plurality of reference security features is absent from the plurality of enforced security features;

causing the artificial intelligence model to generate a summary of the subset of the plurality of reference security features by providing a representation of the subset of the plurality of reference security features as a second input to the artificial intelligence model;

determining extents to which identified reference security features, which are comprised in the subset of the plurality of reference security features, are to increase security of the system;

causing the summary and an explanation to be presented via a user interface, the explanation indicating that the subset of the plurality of reference security features is absent from the plurality of enforced security features in the security policy and indicating a mapping of the identified reference security features to the extents; and the subset of the plurality of reference security features to be enforced in the system by adding the subset of the plurality of reference security features to the plurality of enforced security features in the security policy.

9. The method of claim 8, further comprising:

at a first time instance, training the artificial intelligence model on the security policy template, which comprises the plurality of reference security features;

wherein causing the artificial intelligence model to perform the comparison of the security policy and the security policy template comprises:

at a second time instance that follows the first time instance, causing the artificial intelligence model to perform the comparison of the security policy and the security policy template as a result of the artificial intelligence model being trained on the security policy template.

10. The method of claim 8, wherein causing the artificial intelligence model to generate the summary of the subset of the plurality of reference security features comprises:

providing a first description of the subset of the plurality of reference security features, in lieu of a second description of an entirety of the plurality of enforced security features that are enforced in the system and an entirety of the plurality of reference security features, as the second input to the artificial intelligence model.

11. The method of claim 8, wherein the plurality of enforced security features comprises a plurality of enforced conditional access features;

wherein the subset of the plurality of reference security features comprises a reference conditional access feature; and wherein causing the subset of the plurality of reference security features to be enforced in the system comprises:

causing the reference conditional access feature to be enforced in the system by adding the reference conditional access feature to the plurality of enforced conditional access features in the security policy.

12. The method of claim 8, wherein the subset of the plurality of reference security features comprises a reference authentication feature that requires multifactor authentication for an administrative user of the system; and wherein causing the subset of the plurality of reference security features to be enforced in the system comprises:

causing the reference authentication feature, which requires the multifactor authentication for the administrative user of the system, to be enforced in the system by adding the reference authentication feature to the plurality of enforced conditional access features in the security policy.

13. The method of claim 8, wherein the subset of the plurality of reference security features comprises a reference authentication feature that requires multifactor authentication for a guest user of the system; and wherein causing the subset of the plurality of reference security features to be enforced in the system comprises:

causing the reference authentication feature, which requires the multifactor authentication for the guest user of the system, to be enforced in the system by adding the reference authentication feature to the plurality of enforced conditional access features in the security policy.

14. The method of claim 8, wherein the subset of the plurality of reference security features comprises a reference authentication feature that requires a first authentication technique, which is selected from a plurality of authentication techniques, to be used to authenticate a user of the system; and wherein causing the subset of the plurality of reference security features to be enforced in the system comprises:

causing the reference authentication feature, which requires the first authentication technique to be used to authenticate the user of the system, to be enforced in the system by adding the reference authentication feature to the plurality of enforced security features in the security policy.

15. The method of claim 8, further comprising:

receiving an inquiry regarding the security policy;

wherein causing the summary and the explanation to be presented via the user interface comprises:

causing a response to the inquiry to be presented to via the user interface, the response comprising the summary of the subset of the plurality of reference security features and the explanation, which indicates that the subset of the plurality of reference security features is absent from the plurality of enforced security features in the security policy.

16. The method of claim 8, further comprising:

as a result of determining that the subset of the plurality of reference security features is absent from the plurality of enforced security features, providing an inquiry via the user interface, the inquiry inquiring whether the subset of the plurality of reference security features is to be enforced in the system; and receiving a response to the inquiry, the response indicating that the subset of the plurality of reference security features is to be enforced in the system;

wherein causing the subset of the plurality of reference security features to be enforced in the system comprises:

causing the subset of the plurality of reference security features to be enforced in the system as a result of receiving the response to the inquiry.

17. A computer program product comprising a computer-readable storage medium having instructions recorded thereon for enabling a processor-based system to perform operations, the operations comprising:

determining that a subset of a plurality of reference security features that define a security policy template is absent from a plurality of enforced security features that define a security policy, which is enforced in a system, using an artificial intelligence model by providing the security policy and the security policy template as first inputs to the artificial intelligence model;

generating a summary of the subset of the plurality of reference security features using the artificial intelligence model by providing a representation of the subset of the plurality of reference security features as a second input to the artificial intelligence model;

determining extents to which identified reference security features, which are comprised in the subset of the plurality of reference security features, are to increase security of the system;

causing the summary and an explanation to be presented via a user interface, the explanation indicating that the subset of the plurality of reference security features is absent from the plurality of enforced security features in the security policy and indicating a mapping of the identified reference security features to the extents; and causing the subset of the plurality of reference security features to be enforced in the system by redefining the security policy using the summary of the subset of the plurality of reference security features, wherein redefining the security policy comprises adding the subset of the plurality of reference security features to the plurality of enforced security features.

18. The computer program product of claim 17, wherein generating the summary of the subset of the plurality of reference security features comprises:

providing a first description of the subset of the plurality of reference security features, in lieu of a second description of an entirety of the plurality of enforced security features that are enforced in the system and an entirety of the plurality of reference security features, as the second input to the artificial intelligence model.

19. The computer program product of claim 17, wherein the operations further comprise:

receiving an inquiry regarding the security policy; and wherein causing the summary and the explanation to be presented via the user interface comprises:

causing a response to the inquiry to be presented via the user interface, the response comprising the summary and the explanation.

20. The computer program product of claim 17, wherein the operations further comprise:

as a result of determining that the subset of the plurality of reference security features is absent from the plurality of enforced security features, providing an inquiry via the user interface, the inquiry inquiring whether the subset of the plurality of reference security features is to be enforced in the system; and receiving a response to the inquiry, the response indicating that the subset of the plurality of reference security features is to be enforced in the system; and wherein the subset of the plurality of reference security features is caused to be enforced in the system as a result of receiving the response to the inquiry.

* * * * *